July 30, 1957 C. A. TOCE ET AL 2,801,276
ELECTRIC STORAGE BATTERY
Filed Dec. 17, 1953 2 Sheets-Sheet 1
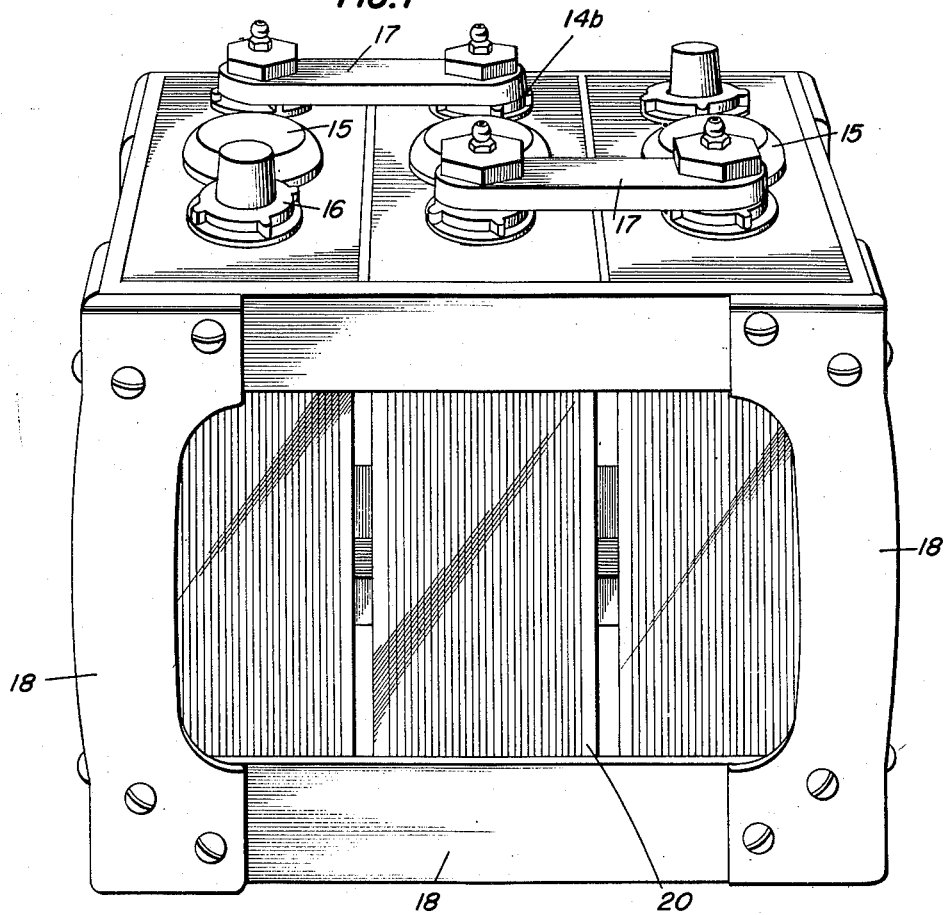
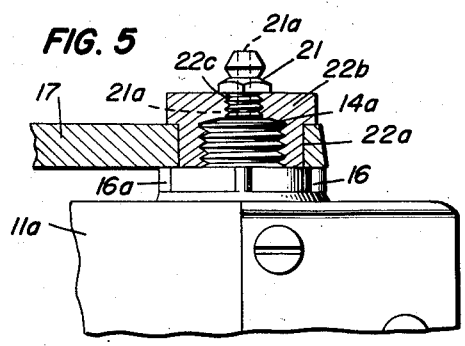
INVENTORS
Charles A. Toce
Robert Broussard
BY
THEIR ATTORNEY July 30, 1957  C. A. TOCE ET AL  2,801,276
ELECTRIC STORAGE BATTERY
Filed Dec. 17, 1953  2 Sheets-Sheet 2
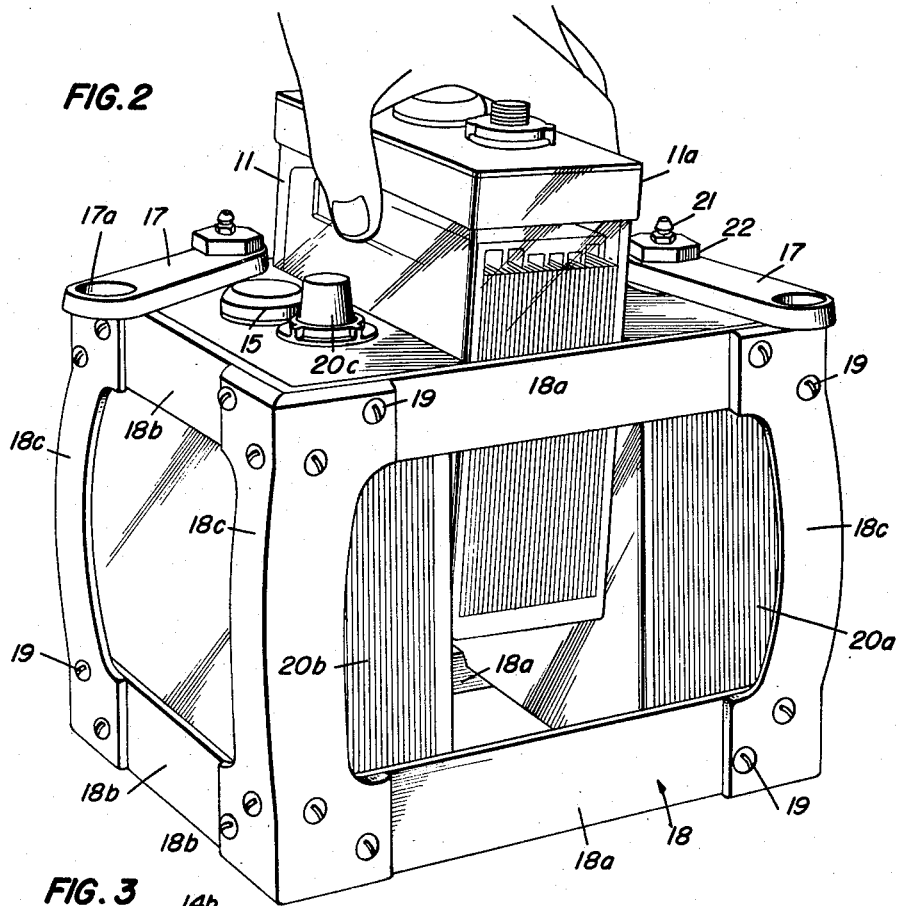
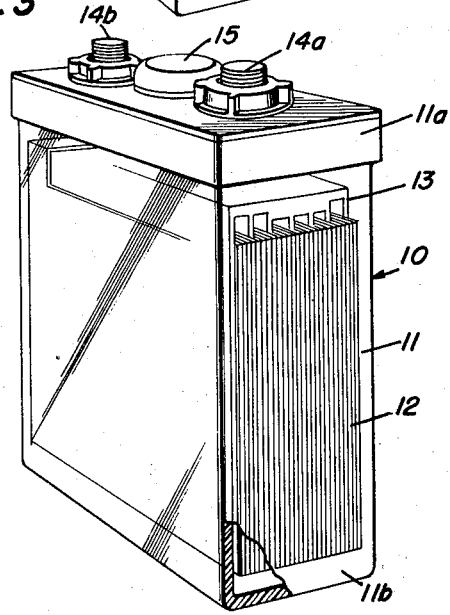
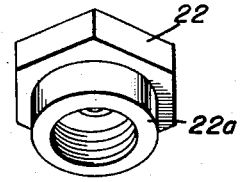
INVENTORS
Charles A. Toce
Robert Broussard
THEIR ATTORNEY

# United States Patent Office 2,801,276
Patented July 30, 1957

2,801,276

ELECTRIC STORAGE BATTERY

Charles A. Toce, Sunland, and Robert Broussard, Glendale, Calif., assignors to Electro-Acid Corporation, a corporation of Texas Application December 17, 1953, Serial No. 398,751

3 Claims. (Cl. 136—166)

Our invention, relating generally to electric storage batteries, more particularly concerns both stationary and portable batteries in which there are many new and advantageous features, all of which cooperate amongst themselves in a product markedly superior to batteries heretofore known in the art.

One object of our invention is to provide an electric storage battery wherein may be employed any desired and conventional combination of battery plates and electrolyte and constructed with such novelty as to permit ready, expeditious and effective removal and replacement of defective cell or cells therein, rapidly and without appreciable disturbance of the remaining cells; and wherein efficient air-cooling of the individual cells is provided while the battery is in service.

Another object is to produce a battery of the general type described wherein the binding posts or similar electrode elements thereof can be effectively shielded against "freezing," so that at all times they can be readily backed off or tightened down on the binding posts, as the case may be, and can be readily and efficiently lubricated to facilitate such movement realtive to the binding posts; and in which construction not only is corrosion in the region of the binding posts effectively resisted, but as well, the presence of contaminating air in the region of the binding post junction is suppressed.

A further object is the provision of an electric storage battery possessing great "eye appeal"; and in which battery the electrolyte level can be readily and accurately determined by simple visual examination without physically contacting the battery, it being a relatively simple matter thereupon to condition the electrolyte to normal operating condition; and wherein likelihood of excessive filling of the battery with electrolyte is effectively suppressed.

Still another object is to produce a battery of the general type described which is characterized by its ruggedness and marked simplicity of construction, its readiness and economy both in initial production and in subsequent maintenance, and its long useful life, even under the widest extremes of both weather and service.

All the foregoing as well as many other highly desirable objects and advantages, attend the practice of our invention; and these will be obvious in part and in part more fully pointed out hereinafter during the course of the following disclosure, particularly when considered in the light of the accompanying drawings.

Our invention accordingly may well be considered as residing in the several parts, elements and combination thereof; in the several features of construction and composition of materials; and in the relation of each of the same with one or more of the others, the scope of the application of all of which is more fully set forth in the claims at the end of this specification.

In the several views of the drawings wherein illustratively we have disclosed that embodiment of our invention which we prefer at present, Figure 1 is a perspective view of a battery assembly embodying certain features of our invention;

Figure 2 is a similar perspective view of the battery assembly according to Figure 1, wherein is more fully displayed the mode of replacing a cell unit;

Figure 3 discloses in perspective, a typical cell unit according to our practice and in which parts are broken away for clarity of disclosure;

Figure 4 discloses in perspective a closure or lockdown cap for the electrodes or binding posts of each cell, the view being taken from the underside of the cap; while In Figure 5 we disclose in vertical cross-section a complete binding post assembly embodying certain details of our invention.

And now, as conducive to more ready and thorough understanding of our invention, it may be noted that, beginning perhaps with the turn of the century, the electric storage battery has impacted with continuously increasing importance both upon our economy and our mode of living. From a technical rarity and novelty it has become an absolute necessity in countless numbers of widely diversified fields of activity. And while practical demand no longer exists in important measure for the large stationary battery installations which were formerly used as stand-by equipment for power systems, those having become obsolete with the advent of the present-day interlocking distributional networks, quite on the contrary the comparatively small and portable electric storage battery has become an absolute necessity. And this, as we have said, in widely diversified fields of application. Illustratively, and with the automobile no longer considered a luxury, but rather, very properly considered to be an absolute essential, it follows at once that the scope of the application of the comparatively small-sized portable battery equipment, has been widely broadened. In short, the portable storage battery has become a necessary product of daily use.

However indispensable these batteries might be, nevertheless the art has recognized that many disadvantages have been basically inherent therein and characteristic thereof. And at least until recently, it was accepted almost universally that from a practical standpoint, these disadvantages were well-nigh inescapable. To illustrate, batteries as heretofore constructed display inherent and characteristic fragility and are readily susceptible to damage. Such disadvantages are strikingly observed when batteries are employed in remote and difficult terrain such as rural or mountainous regions. For in those parts, where illustratively, frozen or rutty roads are encountered, or on access trails to mines or construction jobs or the like the battery, installed in automotive equipment, is subjected to extremes of both weather and mechanical conditions. Moreover failure of battery under such conditions and in such operations is accompanied by failure of the electrical circuits energized thereby. But such failure is not limited alone to the battery itself and its attendant electric circuits. This can best be evidenced by considering the situation created upon failure of the battery casing. Here, upon release of the corrosive electrolyte, usually dilute sulphuric acid, corrosion attends upon and is incident to such mechanical break-down. Severe damage is frequently observed to neighboring equipment, in no wise dependent upon the battery for energization.

Aside from the foregoing, it will be recalled that the longevity and life-expectancy of the modern automotive vehicle has been greatly extended over that of the pre-World War II prototype. Thus it may reasonably be anticipated that the modern day automotive vehicle will provide satisfactory performance for upwards of 75,000 to 100,000 miles or more, and this in the substantial absence of major repairs. Confronted by such favorable performance, the modern day car owner has departed appreciably from the frequent routine service check-ups to which he was formerly accustomed. And he has been lulled into this somnolent attitude by service manual directives that, illustratively, oil need not be changed frequently, and the like.

As it is, required only to make oil changes but every three to four thousand miles or more, with satisfactory car performance even though periods between lubrications extend by upwards of say 2000 miles or more, the operator tends more and more to depart from regular check-up on the servicing details. This is particularly true of the private car owner.

For, following no set schedule of servicing, as is now the practice, it is easy to overlook altogether the comparatively frequent servicing of the electric storage battery. And this is so, despite the fact that it is this very battery which comprises the heart of the electrical system of the vehicle. With distressing frequency the owner's attention is directed to the battery only after the latter is dry, or fully discharged, or one or two cells are completely dead, or after considerable sulphate has deposited from the plate grid to the bottom of the battery casing. By this time, however, permanent damage may have been done. Actually, sulphation usually means that enough of the active plate material has sloughed off the plate grids and deposited on the battery casing to render it impossible for the battery readily to retain a charge. Frequent re-charges at a service station are necessary. Moreover, this condition usually is but a short step ahead of full short-circuiting through the deposit of plate material on the floor of the cell contacting with the plates themselves, so severe has become the sloughing off of plate material and so deep has become the deposit thereof. When this happens, the cell is shorted and that particular cell no longer is serviceable.

Now, where such condition is encountered, it has heretofore been considered impractical from a construction standpoint to replace the faulty cell within the battery. This is largely because, with the construction heretofore employed, replacing a cell requires laborious undoing of permanent construction, inserting a new cell, and this followed by equally tedious reassembly in permanent fashion. Such repair, custom-jobbed for the particular requirement, usually is considerably more expensive than the assembly-line production of an entire new battery. In short, therefore, it is heretofore been almost axiomatic that upon failure of any one cell within a battery the entire battery is lost, and must be replaced in its entirety. High penalty attends upon cell failure, whether it results from inattention or heavy duty service.

This unfortunate situation is all the more highlighted when it is considered that usually, it is a particular cell which fails. For in most cases, and other conditions being equal, it is the cell connected with the positive pole of the associated direct current electric circuit which first fails. Battery action appears to be more severe here than in the other cells.

As another point, it will be recalled that to service an electric storage battery properly ordinary practice requires that the water filler caps first be removed, as by backing off from threaded bosses. Thereupon the operator explores, usually with a flashlight or some similar lighting aid, the level of the electrolyte fluid. Usually this somewhat difficult observation can best be done by viewing from the top. And it is usually only the reflection of the projected light on the electrolyte which enables the operator to reach some conclusion, not necessarily acurate, as to the level of the electrolyte. Severe possibility for error is obvious, and frequently, therefore, it results that the electrolyte is not maintained at proper level even where conscious and sincere effort has been directed to that end.

Another serious defect inherent in present battery construction is the striking tendency of the battery to overheat to a detrimental extent under many conditions of operation. Illustratively, overheating is observed when the battery is subjected to severe and protracted load demand. Heating is similarly encountered under extremes of hot weather operation. Also, when the level of the electrolyte is allowed to fall appreciably below the battery plates. And this detrimental phenomenon is encountered when the level of the electrolyte is allowed to become too high. The compact, unitary battery construction heretofore employed has effectively precluded all possibility of air-washing or otherwise cooling the component cells making up the battery.

Accordingly, an important object of our invention is to avoid, and this almost completely, the many disadvantages and defects heretofore confronting the art, and at the same time to provide a new electric storage battery, and as well, the component parts thereof, wherein electrolyte level can readily be observed, along with other instantaneous battery conditions and battery performance, without disturbance of the battery in any regard; wherein a particular cell can be replaced in the battery without appreciably disturbing the remaining cells, all in rapid, simple and economic manner; and wherein longevity in service is importantly contributed to by effective air-washing and cooling of the component cells of the battery, particularly during periods of use.

And now having particular reference to that embodiment of our invention disclosed in the several views of the drawings, and with especial attention to the disclosure in Figure 3, we indicate a complete and typical cell unit at 10 which embodies the practice and teaching of our invention. Such cell unit includes a casing 11 as part thereof. This casing typically is of generally parallelepiped configuration, with major axis conveniently disposed in a generally vertical direction. This casing 11 is comprised of material which is breakable only with difficulty. Preferably and conveniently, it is unbreakable. Moreover, we desire that this casing 11 possess the quality of transparency or at least a high degree of translucency. This permits visual examination from the exterior as to its contents without disturbing or even contacting the cell in any way. And such observations can be made in ready and efficient manner. Moreover, we prefer that this casing 11 be relatively immune to widely and rapidly varying extremes of temperature. A further requisite is that such casing must be immune to attack by the ordinary electrolyte employed.

Conveniently, we form the casing 11 of the particular plastic polystyrene. Any convenient thickness of material may be employed, provided only that it has requisite mechanical properties. On this casing 11 and as an integral part thereof, we provide a top part 11a. This top 11a may be molded or otherwise conveniently formed as part of the casing 11. In the preferred embodiment and just as the casing 11 we form top 11a of plastic material.

Within casing 11 we provide the customary battery plates 12. These may be of any convenient and conventional material. Illustratively and typically these plates comprise pure lead and lead oxide, respectively. Each plate conveniently has the typical grid-like core, not shown, of lead. The battery is provided with the usual battery plate separators 13 which may be of wood, glass, or other suitable material. When plates 12 are provided within the battery, they terminate short of the bottom 11b thereof. We fill the cell 10 to a suitable level with a suitable electrolyte, which preferably comprises dilute sulphuric acid and an additive of soluble selenium and/or tellurium compound. The proper level is shortly above the top of the battery plates, say about an inch thereabove. By no means, however, are we, nor de we intend to be, limited to the particular plate-electrolyte combination suggested. Any other suitable combination may be employed, illustratively, nickel-cadium with appropriate electrolyte.

It will be seen from the foregoing that simply visual inspection of the cell 11 enables rapid determination of the liquid level within the battery. In ready manner this gives all requisite information as to the operating condition of that particular cell. Moreover, by observing the amount of deposit at the bottom of the cell, on the floor 11b thereof, rather definite determination can be had readily as to the amount of plate material which has sloughed off and deposited on the floor. Ready and comparatively reliable criteria are thus provided as to the extent of wear or deterioration of the battery at any particular time. And as well, fairly accurate indication is given as to the remaining life expectancy of the battery. When it is necessary to add fluid to the battery, it is a matter of but a moment to remove the filler cap 15 in the ordinary manner and fill the cell to the proper level. And in this respect the important advantage exists, that change in liquid level incident to filling can be continuously observed during the filling operation. This makes it possible to control liquid level properly and accurately so that while sufficient water or other fluid will be added to cover the plates to requisite extent, at the same time danger of adding too much water is effectively avoided. This effectively prevents electrolyte "boil-over," and corrosive attack upon terminals and allied equipment, an undesirable phenomenon which is frequently encountered during hot weather operation and when the battery is filled to too great an extent. Through our new battery, however, we successfully suppress this hazard of excessive corrosion in the region of the binding posts.

In our battery construction, suitable electrodes extend upwardly from the terminal ends of the battery plates, and terminate in binding posts 14a and 14b, respectively, for each cell, all as shown in Figures 1, 3, and 5. In that cell, illustratively the middle cell of a three-cell battery, both terminals posts 14a and 14b are threaded for the reception of connectors to be described hereinafter. In the outer cell units, however, which are to be connected to the eyelet ends of associated battery cables, we employ one binding post providing conventional friction-fit as one of the two electrode elements of the cell. We employ this construction in order that the assembled battery may be readily inserted in the ordinary automobile or similar electrical circuit wherein the battery cable terminates in the clamp-down eyelet type of terminal element. This construction, as well as other aspects of the terminal posts, will be described hereinafter with respect to the constructional details disclosed in Figures 1, 2, and 5.

As it is, and having further reference to the disclosure of Figure 3, we provide at a convenient place on top 11a, a filler cap 15. We construct this filler cap of suitable, convenient, and conventional material of which plastic and hard rubber are typical. Preferably, we locate this cap 15 centrally in the top panel 11a of the cell casing 11. The filler cap 15 covers a suitable opening, of conventional type, provided in the top of 11a, through which battery water or electrolyte may be added or removed, as required.

Having reference now to the construction more specifically shown in detailed view in Figure 5, it will be seen that at the top of casing 11a we fit a spacing member 16 nicely around the binding post 14a, resting the same snugly against the top 11a of the casing 11. Projecting wing elements 16a extend outwardly and radially from spacing member 16. These projections facilitate manipulation thereof. We fit a connector or jumper bar 17 about the threaded post 14a, on top of the spacing element 16. The purpose of jumper bar 17 will be more fully described hereinafter. Bar 17 terminates at each end in an eyelet portion 17a, and it is by the cooperating eyelet portion 17a that the connector 17 is fitted about the associated binding post 14a. We then thread down a lock-down nut 22 by means of its downwardly projecting threaded contact portion 22a, sleeve-like in shape, about the threaded part 14a of the associated post 14. Sleeve portion 22a, when threaded down on the threaded boss 14a, engages snugly within the eyelet 17a of connector 17, and holds it firmly in place.

As has been stated hereinbefore an important feature of our invention is that, as desired, any particular cell can be removed from the battery. And this we can do in ready and efficient manner, as upon battery failure during service. This permits us to achieve important operating economies. To facilitate such removal, we provide a skeletonized frame for the battery cell units, which frame holds the cells together in a composite battery assembly. We indicate such frame at 18 in Figures 1 and 2. Conveniently, this frame 18 has generally the shape of a parallelepiped, the structural components of which make up and outline the parallelepiped configuration. Thus we provide an open, lattice-work frame. This frame defines sight openings or windows 18a on the horizontal sides or walls thereof. Thus not only are important economies achieved in quantity of frame material required, but advantage is taken of such construction to provide sight openings for ready inspection of the cells unto themselves. This frame 18 may be of any desired suitable construction and may be formed of any desired suitable material, as for example, pressed or stamped metal. The stampings may be unitary or monolithic in construction, or the frame may be of fabricated type and in which the structural or component elements are secured together in desired suitable manner, as by welding or the like.

In the preferred embodiment shown herein, however, we provide stamped elements, comprising longitudinal upper and lower side members 18a, transverse upper and lower side members 18b and vertical posts 18c all secured together in suitable manner as by removable screws 19, 19. In this construction disassembling the battery frame 18 required but a moment, and this for any desired purpose, as for shipping or the like. Similarly, ready initial assembly or subsequent re-assembly is made possible. It will be seen from the foregoing that it is entirely within the contemplation of our invention to ship the battery in knock-down condition, as for example by having the frame 18 disassembled, the battery cell units being shipped separately and without electrolyte. Then following this practice we assemble the battery at the distribution point as by assembling the frame and filling the cell units with the electrolyte.

The cell units just described may be assembled, in a complete battery assembly, in a number sufficient to provide requisite battery output voltage. Illustratively, we provide three such cell units where we desire a battery of six volt output. While if the modern-day twelve volt battery is to be provided, we employ six such cell units, all connected in series. The modern-day twelve volt construction emphasizes and highlights the desirability and utmost necessity of eliminating the requirement that the entire battery be discarded upon failure of only a single one out of the six component cell units.

As it is, however, and until the teaching of our invention, it has been necessary from a practical standpoint to discard the entire battery upon the failure of any single cell unit therein, this for the reason that it has heretofore been far too costly to replace a defective cell unit in a battery. Particularly is this true where, as heretofore has been the case, it has been impossible to observe the physical condition of the remaining cell units. With the present invention, however, upon failure in any particular cell unit, the condition of all of the remaining units can be readily and visually observed; and the most desirable mode of repairing the damage can be readily and rapidly decided upon.

The description heretofore has been largely with respect to the central cell unit 11 in the battery shown in Figures 1 and 2. Consideration will now be given to one of the end cell units of the battery, say cell 20a or 20b therein. These are best shown in Figures 1 and 2. The terminal post 20c of these end cell units and as shown therein, differs from the terminal post 14a as heretofore described. Whereas the terminal post 14a is threaded for the reception of the connector 17 (to be described), the terminal post 20c is smoothly rounded and tapered on its exterior surface. This taper is for the reception of the eyelet portion of an associated battery cable, of conventional type. Friction fit occurs between these elements, and the split eyelet of the cable is tightened around the terminal post 20c by means of a suitable clamping screw or the like. All this is conventional in the art, and no further illustration is given here, for simplicity. Other than with respect to these cable-associated battery terminals 20c, 20c, the cell units 20a and 20b are exactly like the central cell unit 11 already described. Accordingly, no further description is given thereof. And it will be seen from the foregoing that the cell units can readily be fabricated from identical parts, with final assembly, before mounting the same and sealing them in the casing, including a determination of what particular terminal post or posts is employed with the particular cell unit.

In assembly, the cell units are operably connected together by means of the connectors 17, 17 (Figures 1, 2 and 5). Eyelets 17a are provided near each end thereof. As we have heretofore described with respect to the construction according to Figure 5, those eyelets 17a fit snugly over the threaded portions 14a of the associated terminal post 14. With the parts assembled in this manner we thread down thereon lock-down nuts 22, using for that purpose their hexagonal heads 22b. This secures the connectors 17 firmly in place. It is a matter of but a moment however, and when desired, to back off the lock-down nuts 22 and to remove the associated connector 17 and spacing element 16. We can thereupon remove in ready manner the defective cell unit from the frame 18c. And this, without further disturbance of the remaining cell elements. Of course, if it is a terminal cell unit which has failed, the clamping bolt of the split eyelet of the associated battery cable is backed off, and the friction fit between the eyelet and the associated terminal post is released, whereupon this spacing washer 16 can be removed and the cell unit freed for removal.

To facilitate the foregoing we provide on each of the bottom frame members 18a horizontally projecting bottom flange 18d to serve as a footing for the cell units. We provide generally similar construction on the horizontally extending sidebars 18e (Figure 5). In this manner, ample support is provided in assembly for the individual cell units.

It is apparent from the foregoing that in manufacture, the battery frame 18 is first assembled. The cell units, of requisite number and type, are thereupon mounted within the frame 18. Care is provided that one of the outer cell units be provided at each end of the frame, while a central unit is provided centrally thereof, between the outer cell units. The spacing washers 16 are then provided about each terminal post, two for each cell unit. The connectors or jumper bars 17 are then provided between paired and adjacent terminals 14 of the cell units, fitting thereover by means of the eyelet 17a, 17a provided therein. We next seat the lockdown nuts 22, by means of the hexagonal wing portions 22b thereof. The cell units are then filled with electrolyte as required to bring the fluid to proper level and the battery is ready for charging. Where desired, of course, the cells may be filled with electrolyte and charged prior to assembly in frame 18. As thus described, the battery is ready either for instant installation or for storage.

It is to be kept in mind that one of the most desirable features of our new battery is the rapid manner in which the cell units may be disconnected from each other through the jumper bars 17, when need for replacement of a particular cell unit arises. This makes it imperative that the constructional elements of each binding post assembly be readily removable.

However corrosion, usually encountered in battery practice, ordinarily tends to freeze these elements of the battery post assemblies. This renders removal extremely difficult, unless precautions are taken to prevent this. Accordingly, and utilizing for this purpose the threaded assembly of the binding post which we employ, we terminate the post assembly in an outer, pressure-lubrication fitting. We show this fitting at 21 in Figure 5. To permit this construction we provide in the end of the lock-down cap 22, and centrally thereof, a small opening 22c. We thread this opening 22c for the reception of the threaded shank 21a of the pressure-fitting 21 which itself is provided with axial hole 21a. This pressure-fitting may be of any conventional type, such as Alemite. Conveniently, however, it may be of some other suitable type, such as are readily available on the market. Through the application of graphite or other electrically conductive lubricant under pressure through this fitting, we ensure that the battery terminal assembly is adequately lubricated at all times, air is displaced and that corrosion is effectively resisted. The tight fit between the various elements of the terminal post assembly contribute to this exclusion and suppression of corrosion.

It is apparent from the foregoing that following the practice of our invention, it is a simple matter to determine not only the condition of initial assembly of each cell unit, but as well, the momentary operating condition thereof, while in subsequent service. The condition of the plates, and the amount of active plate material which has deposited out on the floor of the cell, can be quickly observed. As well, and even more important, the momentary level of the electrolyte within the cell can be determined, and the conditions accurately and rapidly controlled. Existence of mechanical damage can be visually determined. Filling can be controlled nicely so that while the electrolyte properly covers the battery plates, its level will be maintained below such point as will cause boiling over under hot operating conditions. Thus we provide an additional safeguard against corrosion.

In service, we can quickly replace any one of the several cell units, as desired, without appreciable disturbance of the remaining elements. Where a twelve volt or similar battery installation is involved, it is only those cells adjacent to that which is being replaced, which need be disturbed at all. Corrosion is effectively resisted. Mechanical breakage is greatly minimized. For the plastic cell casing is strangely resistant to mechanical failure, and tends to yield under load rather than fracture. Should the battery become damaged in any way, it will usually be only a single cell which is damaged, and this can be replaced without loss of the entire battery.

All the foregoing, as well as many other highly practical advantages not herein specifically referred to, attend upon the practice of our invention.

Many modifications of the present embodiment will readily suggest themselves to those skilled in the art, and as well, many embodiments, generally similar to those disclosed, yet falling within the scope of our invention, will likewise readily occur to those skilled in the art. Accordingly, we intend the foregoing disclosure to be considered as purely illustrative and not as comprising a limitation.

We claim:

1. An electric storage battery comprising an open skeleton frame having spaced parallel longitudinal upper and lower side members, spaced parallel upper and lower transverse members, and spaced parallel vertical members interconnecting upper and lower members to form said open skeleton frame; and a plurality of individual cell units received therein, said cell units being provided with individual separated cases to permit ventilation between said units.

2. An electric storage battery comprising an open skeleton frame having spaced longitudinal upper and lower parallel side members, corresponding upper and lower spaced parallel transverse members, and spaced parallel vertical members, all secured to form said open frame; and separate electric storage battery cell units received within said frame and carried thereby, each cell unit having an individual case and electrical terminal posts thereon, connectors removably engaging on the associated terminal posts of the adjacent cells, electrically connecting them together, and means securing said connectors to said posts.

3. An electric storage battery comprising an open skeleton frame having spaced longitudinal upper and lower parallel side members, spaced parallel transverse members, and spaced vertical members, all said members being secured to form said open skeleton frame; and separate electric storage battery cell units received within said frame and carried thereby, each cell unit having a plastic casing and electrical terminal posts thereon, connectors removably engaging on the associated terminal posts of the adjacent cells, electrically connecting them together, threaded means securing the connectors to the posts, and lubricating fittings provided on said threaded means to permit lubrication in service of the component parts of the associated posts.

References Cited in the file of this patent

UNITED STATES PATENTS

| | | |
|---|---|---|
| 733,697 | Chronik | July 14, 1903 |
| 1,543,017 | Lea | June 23, 1925 |
| 1,572,073 | Murphy | Feb. 9, 1926 |
| 2,235,062 | Bak | Mar. 18, 1941 |
| 2,548,558 | Raney | Apr. 10, 1951 |

OTHER REFERENCES

Electrical Mfg., April 1953, page 340.